United States Patent
Wang et al.

(10) Patent No.: US 10,602,465 B2
(45) Date of Patent: Mar. 24, 2020

(54) MULTI-RADIO ACCESS TECHNOLOGY SYNCHRONIZATION SIGNAL

(71) Applicant: QUALCOMM Incorporated, San Diego, CA (US)

(72) Inventors: Xiao Feng Wang, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 15/045,477

(22) Filed: Feb. 17, 2016

(65) Prior Publication Data

US 2017/0070967 A1    Mar. 9, 2017

Related U.S. Application Data

(60) Provisional application No. 62/216,321, filed on Sep. 9, 2015.

(51) Int. Cl.
| | |
|---|---|
| H04W 56/00 | (2009.01) |
| H04W 48/10 | (2009.01) |
| H04W 88/10 | (2009.01) |

(52) U.S. Cl.
CPC ....... *H04W 56/0005* (2013.01); *H04W 48/10* (2013.01); *H04W 88/10* (2013.01)

(58) Field of Classification Search
None
See application file for complete search history.

(56) References Cited

U.S. PATENT DOCUMENTS

| | | | |
|---|---|---|---|
| 2010/0278142 A1* | 11/2010 | Dwyer | H04W 36/0066 370/331 |
| 2012/0039284 A1* | 2/2012 | Barbieri | H04W 48/10 370/329 |
| 2012/0282926 A1* | 11/2012 | Zappulla | H04W 48/10 455/434 |
| 2013/0010715 A1* | 1/2013 | Dinan | H04W 72/0406 370/329 |

(Continued)

FOREIGN PATENT DOCUMENTS

| | | |
|---|---|---|
| EP | 2887760 A1 | 6/2015 |
| EP | 3076737 A1 | 10/2016 |

(Continued)

OTHER PUBLICATIONS

ISA/EP, International Search Report and Written Opinion of the International Searching Authority, Int'l Application No. PCT/US2016/045973, dated Mar. 29, 2017, European Patent Office, Rijswijk, NL, 13 pgs.

(Continued)

*Primary Examiner* — Noel R Beharry
*Assistant Examiner* — Rodrick Mak
(74) *Attorney, Agent, or Firm* — Holland & Hart LLP

(57) ABSTRACT

Methods, systems, devices, and apparatuses are described for radio access technology (RAT) detection and identification. A user equipment (UE) may decode a multi-RAT primary synchronization signal (PSS). The multi-RAT PSS may be common among a plurality of RATs. The UE may decode, based on the decoded multi-RAT PSS, a secondary synchronization signal (SSS). The UE may identify, based on the decoded SSS, a RAT associated with the multi-RAT PSS and the SSS.

26 Claims, 10 Drawing Sheets

(56) References Cited

U.S. PATENT DOCUMENTS

| | | | |
|---|---|---|---|
| 2013/0023267 A1 | 1/2013 | Ong et al. | |
| 2013/0208587 A1* | 8/2013 | Bala | H04W 16/14 370/230 |
| 2013/0232367 A1 | 9/2013 | Matsumura et al. | |
| 2014/0003385 A1* | 1/2014 | Dinan | H04W 16/02 370/329 |
| 2014/0349645 A1* | 11/2014 | Webb | H04L 5/0091 455/435.1 |
| 2015/0110048 A1 | 4/2015 | Damnjanovic et al. | |
| 2015/0304023 A1* | 10/2015 | Cho | H04W 88/06 370/329 |
| 2015/0350961 A1* | 12/2015 | Cho | H04W 48/14 455/436 |
| 2016/0150536 A1* | 5/2016 | Valliappan | H04W 74/0816 370/329 |
| 2016/0308636 A1* | 10/2016 | Deng | H04W 72/08 |
| 2017/0013565 A1* | 1/2017 | Pelletier | H04W 52/146 |
| 2017/0272217 A1* | 9/2017 | Li | H04W 28/08 |
| 2018/0020462 A1* | 1/2018 | Xiong | H04W 72/1215 |
| 2018/0160363 A1* | 6/2018 | Xu | H04W 48/16 |
| 2018/0184390 A1* | 6/2018 | Wu | H04L 27/2613 |

FOREIGN PATENT DOCUMENTS

| | | | |
|---|---|---|---|
| WO | WO-2014109684 A1 | 7/2014 | |
| WO | WO-2015100532 A1 * | 7/2015 | H04W 72/08 |

OTHER PUBLICATIONS

Shukur of al., "Mobile Cell Selection in 4G Long Term Evolution-Advanced (LTE-A) Networks," American Journal of Engineering Research (AJER), May 1, 2014, pp. 139-150, XP055316519, e-ISSN : 2320-0847, p-ISSN : 2320-0936, vol. 03, Issue-05. Retrieved from the Internet: URL: http://www.ajer.org/papers/v3(5)/Q035139150.pdf [retrieved on Nov. 4, 2016].

* cited by examiner

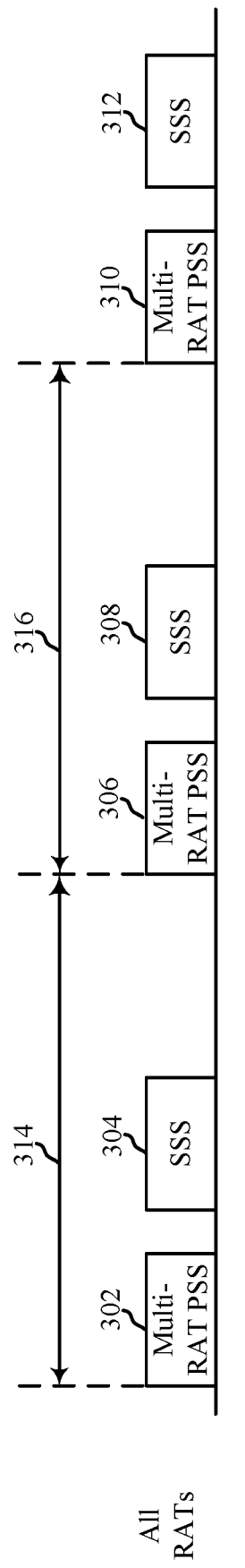
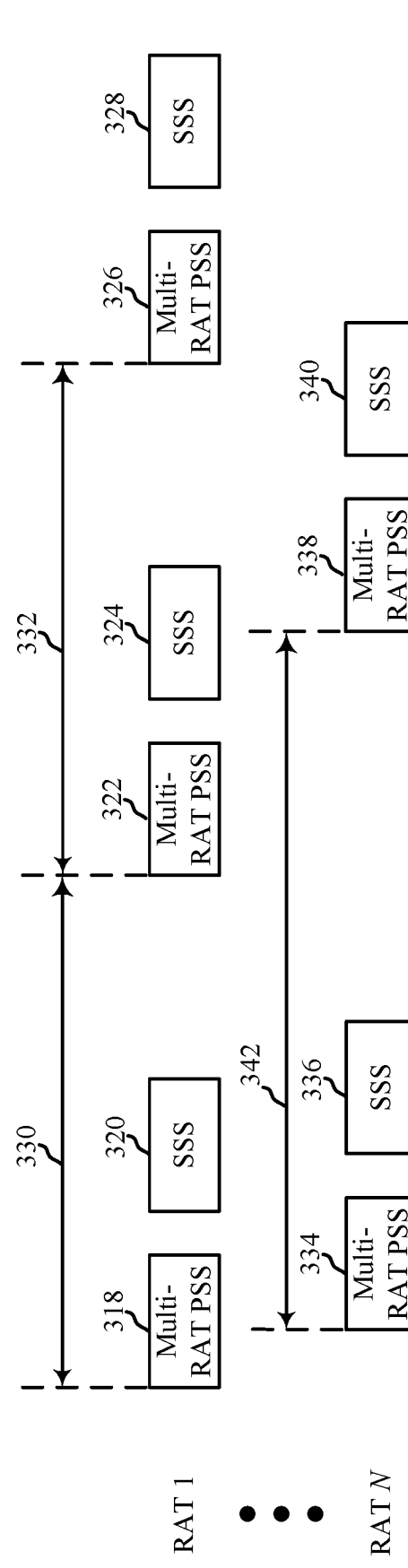
FIG. 3A
FIG. 3B

MULTI-RADIO ACCESS TECHNOLOGY SYNCHRONIZATION SIGNAL

CROSS REFERENCES

The present application for patent claims priority to U.S. Provisional Patent Application No. 62/216,321 by Wang et al., entitled "Multi-Radio Access Technology Synchronization Signal," filed Sep. 9, 2015, assigned to the assignee hereof, and expressly incorporated by reference herein.

BACKGROUND

Field of the Disclosure

The present disclosure, for example, relates to wireless communication systems, and more particularly to synchronization signals for multiple radio access technologies.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). A wireless communication system may include base stations that provide wireless communication using one, or more than one radio access technologies (RATs), or operation modes. Operation modes within a single RAT may have different physical parameters.

When a UE first attempts to connect to a base station, the UE will traditionally know the RAT it expects to communicate on. For example, the UE may tune to a channel and attempt to detect a first RAT (e.g., long term evolution (LTE) RAT). If the first RAT is not detected, the UE may attempt to detect a second RAT (e.g., a global system for mobiles (GSM) RAT). The UE will continue this process for each known RAT until the UE eventually detects an available RAT and connects to the base station. This time and power consuming process may be particularly demanding in certain deployment scenarios where different RATs are used. For example, when a UE is first powered on in a new location, the UE may not be aware of which cellular infrastructure (e.g., RAT) is deployed in the new location. Therefore, the UE may be forced to try and detect numerous RATs before finally detecting an available RAT.

SUMMARY

The described features generally relate to one or more improved methods, systems, or devices that provide for use of a common synchronization signal among a plurality of radio access technologies (RATs). For example, different RATs may use the same synchronization signal, or at least a portion of the synchronization signaling may be the same. Broadly, the common synchronization signal may be usable by UEs to blindly detect an available RAT without having to search for individual RATs. Generally, the improved methods may include a user equipment (UE) decoding the common synchronization signal. The common synchronization signal may be a multi-RAT primary synchronization signal (PSS). The multi-RAT PSS may have a structure and/or include similar information for each associated RAT, e.g., each multi-RAT PSS may include timing information associated with the RAT, frequency information associated with the RAT, etc. The UE may use the information decoded in the multi-RAT PSS to decode a secondary synchronization signal (SSS). The SSS may be the same or different for respective RATs. The SSS may, in some examples, include an information element (IE) that identifies the associated RAT. The UE may then use the decoded SSS to identify the associated RAT. Thus, the UE may detect synchronization signals and identify the deployed RAT without knowing beforehand which RAT is in operation in the area.

In a first illustrative set of examples, a method for wireless communication is described. The method may include: decoding a multi-radio access technology (multi-RAT) primary synchronization signal (PSS), the multi-RAT PSS being common among a plurality of radio access technologies (RATs); decoding, based at least in part on the decoded multi-RAT PSS, a secondary synchronization signal (SSS); and identifying, based at least in part on the decoded SSS, a RAT associated with the multi-RAT PSS and the SSS.

In some aspects, identifying the RAT may include identifying a RAT sequence number included in the SSS, the RAT sequence number comprising an identifier of the RAT. The RAT sequence number may include a modulation scheme associated with the identified RAT. Identifying the RAT may include: determining a periodicity associated with the decoded SSS; and identifying the RAT based at least in part on the periodicity. Identifying the RAT may include: determining a periodicity associated with the multi-RAT PSS; and identifying the RAT based at least in part on the periodicity. Identifying the RAT may include determining a format of the decoded SSS; and identifying the RAT based at least in part on the format of the decoded SSS.

In some aspects, the method may include performing wireless communications on one or more channels of the identified RAT. The identified RAT may include at least one of a global system for mobiles (GSM) RAT, or a universal mobile telecommunications service (UMTS) RAT, or a long term evolution (LTE) RAT, or combinations thereof. The multi-RAT PSS may include a timing component and a frequency component associated with the identified RAT.

In some aspects, at least two RATs of the plurality of RATS utilize the same physical layer modes, wherein each of the at least two RATs utilize different physical layer parameters. The at least two RATs are the same RAT.

In some aspects, at least two RATS of the plurality of RATs utilize orthogonal frequency division multiple access (OFDMA) techniques for downlink communications, wherein each of the at least two RATs utilize a different tone spacing parameter and a different cyclic prefix length. The at least two RATs are different RATs.

In a second illustrative set of examples, an apparatus for wireless communication is described. The apparatus may include: a processor; memory in electronic communication with the processor; and instructions stored in the memory. The instructions being executable by the processor to: decode a multi-radio access technology (multi-RAT) primary synchronization signal (PSS), the multi-RAT PSS being common among a plurality of radio access technologies (RATs); decode, based at least in part on the decoded multi-RAT PSS, a secondary synchronization signal (SSS); and identify, based at least in part on the decoded SSS, a RAT associated with the multi-RAT PSS and the SSS.

In some aspects, the instructions to identify the RAT are further executable by the processor to: identify a RAT sequence number included in the SSS, the RAT sequence number comprising an identifier of the RAT. The RAT sequence number may include a modulation scheme associated with the identified RAT. The instructions to identify the RAT are further executable to: determine a periodicity associated with the decoded SSS; and identify the RAT based at least in part on the periodicity. The instructions to identify the RAT are further executable to: determine a periodicity associated with the multi-RAT PSS; and identify the RAT based at least in part on the periodicity. The instructions to identify the RAT are further executable to: determine a format of the decoded SSS; and identify the RAT based at least in part on the format of the decoded SSS.

In some aspects, the apparatus may include instructions executable by the processor to: perform wireless communications on one or more channels of the identified RAT. The identified RAT may include at least one of a global system for mobiles (GSM) RAT, or a universal mobile telecommunications service (UMTS) RAT, or a long term evolution (LTE) RAT, or combinations thereof. The multi-RAT PSS may include a timing component and a frequency component associated with the identified RAT.

In some aspects, at least two RATs of the plurality of RATS utilize the same physical layer modes, wherein each of the at least two RATs utilize different physical layer parameters. The at least two RATs are the same RAT.

In some aspects, at least two RATS of the plurality of RATs utilize orthogonal frequency division multiple access (OFDMA) techniques for downlink communications, wherein each of the at least two RATs utilize a different tone spacing parameter and a different cyclic prefix length. The at least two RATs are different RATs.

In a third illustrative set of examples, an apparatus for wireless communication is described. The apparatus may include: means for decoding a multi-radio access technology (multi-RAT) primary synchronization signal (PSS), the multi-RAT PSS being common among a plurality of radio access technologies (RATs); means for decoding, based at least in part on the decoded multi-RAT PSS, a secondary synchronization signal (SSS); and means for identifying, based at least in part on the decoded SSS, a RAT associated with the multi-RAT PSS and the SSS.

In some aspects, the means for identifying the RAT may include means for identifying a RAT sequence number included in the SSS, the RAT sequence number comprising an identifier of the RAT. The RAT sequence number may include a modulation scheme associated with the identified RAT.

In a fourth illustrative set of examples, a non-transitory computer-readable medium storing computer-executable code for wireless communication is described. The code executable by a processor to: decode a multi-radio access technology (multi-RAT) primary synchronization signal (PSS), the multi-RAT PSS being common among a plurality of radio access technologies (RATs); decode, based at least in part on the decoded multi-RAT PSS, a secondary synchronization signal (SSS); and identify, based at least in part on the decoded SSS, a RAT associated with the multi-RAT PSS and the SSS.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 3A to 3C show examples of synchronization signal transmission schemes for radio access technology identification, in accordance with various aspects of the present disclosure;

DETAILED DESCRIPTION

The internet of things (IoT) may utilize different radio access technologies (RATs) to provide connectivity in expanding geographic areas. For example, a stand-alone IoT solution may include re-purposing a channel from one RAT to a different RAT. Other examples include differing and/or multiple RATs being deployed within a coverage area. A wireless device, e.g., a user equipment (UE), that is initially powered on in such an environment may not know which RAT is deployed. Traditional techniques, however, do not provide a mechanism for blind RAT detection. Instead, such techniques may include the UE searching for one RAT after another until a RAT is finally detected. For example, the UE may power up and attempt to detect a long term evolution (LTE) RAT. If no LTE RAT is detected, the UE may then attempt to detect a universal mobile telecommunication service (UMTS) RAT. If no UMTS RAT is detected, the UE may then search for a global system for mobiles (GSM) RAT. This process of elimination consumes valuable time and resources of the UE and interrupts user service.

According to aspects of the present description, a UE may detect an available RAT by decoding a multi-RAT synchronization signal. For example, the UE may decode a multi-RAT primary synchronization signal (PSS) that is a common synchronization signal shared by a plurality of RATS. For example, for each RAT, the multi-RAT PSS may have the same structure, format, etc., and may also include similar information (e.g., timing and/or frequency synchronization information). The UE may use the information decoded in the multi-RAT PSS to decode a secondary synchronization signal (SSS). The SSS may be a common SSS among different RATS or may be different for each RAT. The UE may identify the associated RAT based on the decoded SSS. For example, the SSS may include an information element (IE) that explicitly identifies the RAT and/or may implicitly identify the RAT, e.g., based on a format and/or content of the SSS. In some examples, the UE may identify the RAT based on a periodicity of the multi-RAT PSS, the SSS, or both synchronization signals. Thus, the UE may quickly detect and identify the RAT without prior knowledge of which RAT is deployed.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
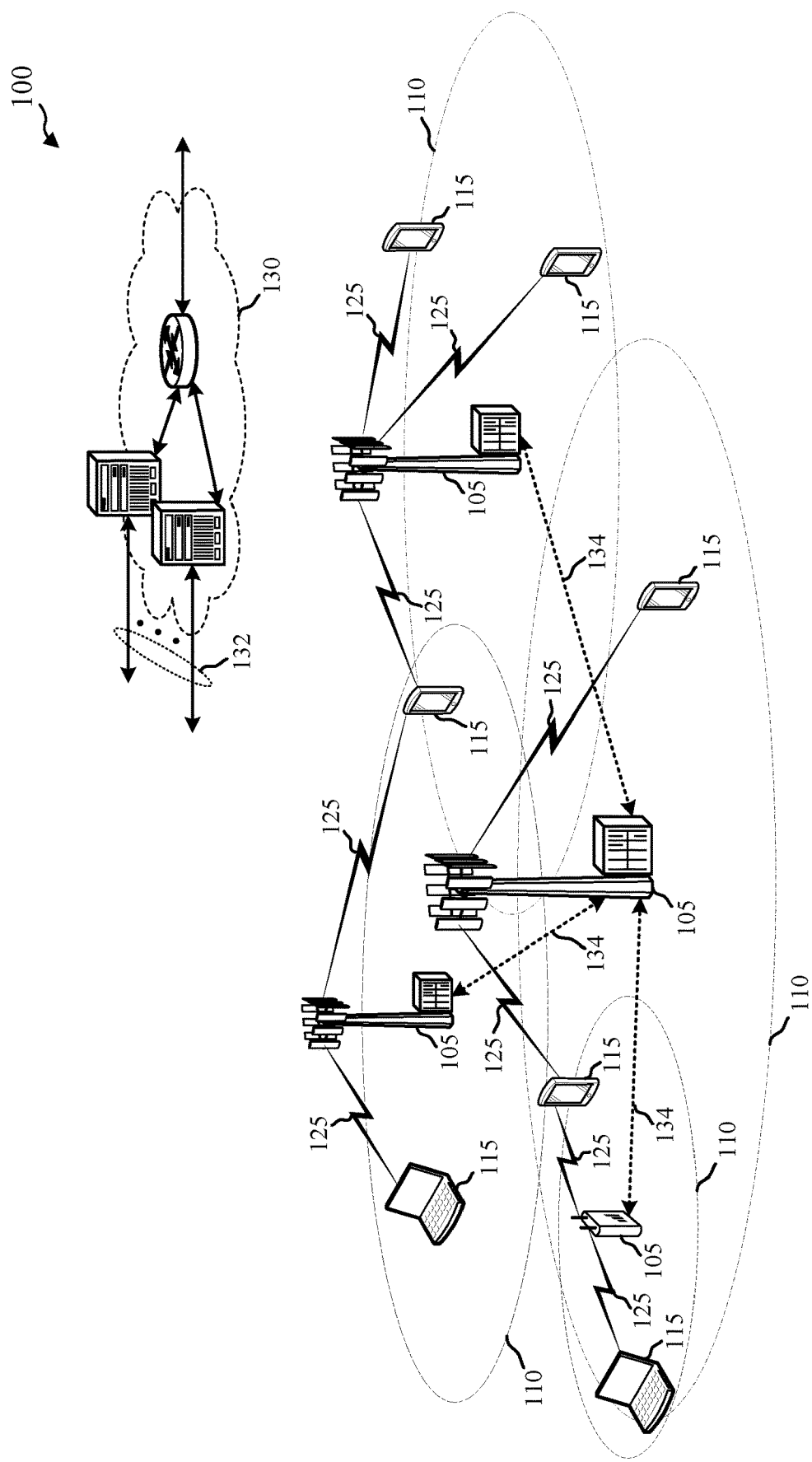
FIG. 1 shows a block diagram of a wireless communication system, in accordance with various aspects of the present disclosure.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area. The wireless communications system 100 may include base stations 105 of different types (e.g., macro and/or small cell base stations). The wireless communications systems may include base stations 105 that communicate using different RATs. For example, a RAT may refer to the access technology used for radio communications. In other examples, the RAT may refer to differing physical layer modes that share the same access technology, but may differ in various physical layer parameters. There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions and/or utilize different RATs. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations 105 and network equipment including macro eNBs, small cell eNBs, relay base stations, and the like. A UE 115 may also be able to communicate with base stations 105 using different RATs.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communications system 100 may support a common synchronization signal that is shared or similar among multiple RATs. For example, base stations 105 may be able to communicate using various RATs where each base station 105 utilizes a multi-RAT PSS format or structure. Generally, the multi-RAT PSS may, for each associated RAT, include a timing component or parameter, a frequency component or parameter, or both, for the RAT. The information included in the multi-RAT PSS may provide an indication of an associated SSS for the RAT that a UE 115 can use to detect and decode the SSS. The UE 115 may decode the multi-RAT PSS and, based on the information included or conveyed in the multi-RAT PSS, the UE 115 may detect and decode the SSS. The UE 115 may use the SSS to identify the RAT associated with the multi-RAT PSS and SSS. The SSS may, in some examples, explicitly or implicitly convey an identification information element associated with the RAT. In other examples, the UE 115 may identify the RAT based on periodicity information determined for the multi-RAT PSS and/or SSS. Thus, the UE 115 may use the common synchronization signal to detect and identify the RAT available for communications.

Figure 2:
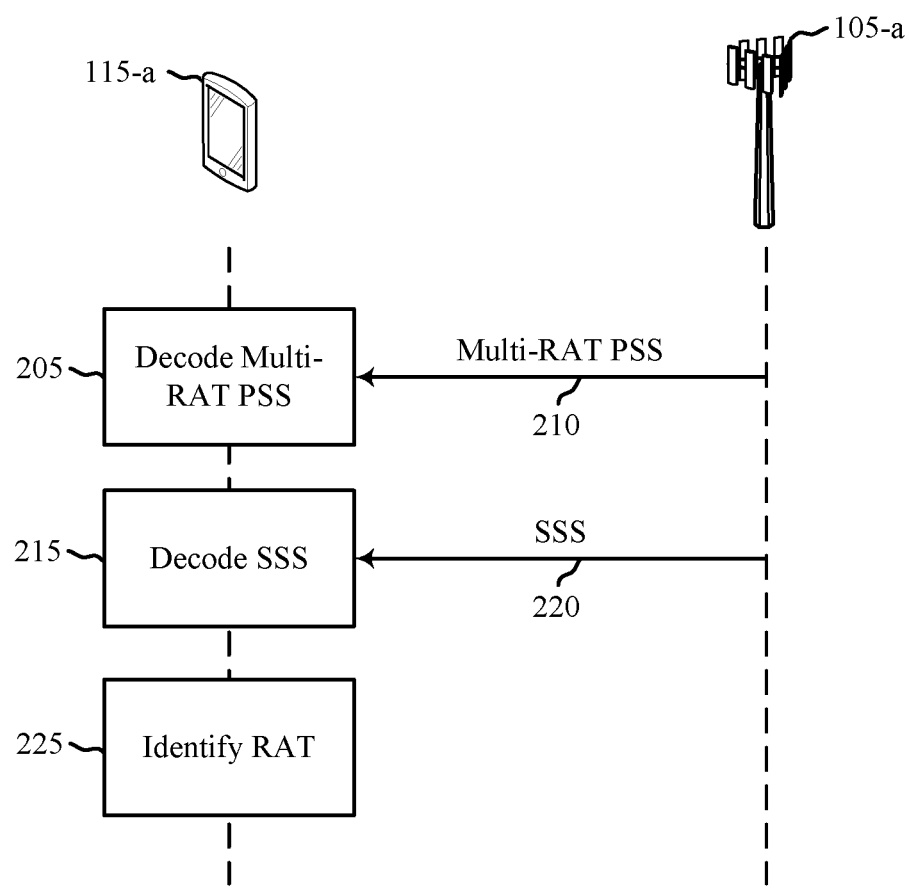
FIG. 2 shows an example of communications between a user equipment and a base station for radio access technology identification, in accordance with various aspects of the present disclosure.

FIG. 2 is a diagram 200 that shows an example of communication between a UE 115-a and a base station 105-a, in accordance with various aspects of the present disclosure. The diagram 200 may illustrate aspects of the wireless communications system 100 described with reference to FIG. 1. The UE 115-a and/or the base station 105-a may be examples of one or more of the UEs 115 and/or the base stations 105, respectively, described above with respect to FIG. 1. In some examples, a system device, such as one of the UEs 115 or base stations 105 may execute one or more sets of codes to control the functional elements of the device to perform some or all of the functions described below.

At 205, the UE 115-a may decode a multi-RAT PSS received from the base station 105-a at 210. The multi-RAT PSS may be a common synchronization signal among multiple RATs. For example, the UE 115-a may be initially powered up and able to detect a cellular infrastructure for wireless communications. The UE 115-a may not know however which RAT is utilized by the surrounding cellular infrastructure. Therefore, the UE 115-a may tune to a channel to detect the multi-RAT PSS. The UE 115-a may know that some or all of the applicable RATs will use the common multi-RAT PSS. Examples of different RATs include, but are not limited to, an LTE RAT, a UMTS RAT, a GSM RAT, etc. Other examples of RATs include different RATs that utilize orthogonal frequency division multiple access (OFDMA) in the downlink, wherein each RAT uses a different time spacing, a different cyclic prefix length, etc. In one example, a RAT may include access technologies that share physical layer modes using the same principles, but differ in certain physical layer parameters.

In some aspects, the multi-RAT PSS may include or otherwise convey a timing parameter for the associated RAT, a frequency parameter for the associated RAT, or both parameters. The timing and/or frequency parameters may provide frame alignment information for communications via the associated RAT. The timing and/or frequency parameters may provide an indication of the timing and/or location of a SSS for the associated RAT, e.g., may provide an indication of which frequency and when the UE 115-a may try to detect the SSS. Generally, the multi-RAT PSS is transmitted according to a periodic schedule. The periodicity of the multi-RAT PSS may be the same or different for the plurality of RATs. In some aspects, the periodicity of the multi-RAT PSS may convey an indication of the identity of the associated RAT.

At 215, the UE 115-a may decode a SSS received from the base station 105-a at 220. The UE 115-a may decode the SSS based on the decoded multi-RAT PSS. The SSS may be a common synchronization signal used by the plurality of RATs. In some examples, the SSS may include or convey an identification of the associated RAT, e.g., the RAT associated with the base station 105-a. The SSS may be transmitted according to a periodic schedule. The periodicity of the SSS may be the same or different for the plurality of RATs. In some aspects, the periodicity of the SSS may convey an indication of the identity of the associated RAT.

In some examples, the SSS may include an information element that identifies the associated RAT. For example, the SSS may include a sequence number that identifies the RAT. The sequence number may, in some examples, include a modulation scheme for the RAT that also conveys the identification of the RAT. For example, different RATs may use different modulation schemes. The UE 115-a may know which modulation scheme is associated with a particular RAT.

In some examples, the SSS may include a format or structure. The format may be the same or different for the plurality of RATs. The format may convey the identification of the associated RAT. For example, the SSS format for a first RAT may be different from the SSS format for a second RAT. A UE 115-a decoding the SSS may identify the format of the SSS and therefore deduce the identification of the associated RAT.

At 225, the UE 115-a may identify the RAT associated with the multi-RAT PSS and the SSS based on the decoded SSS. For example, the UE 115-a may identify the associated RAT using the information element carried in the SSS, based on a periodicity of the SSS and/or the multi-RAT PSS, based on the format of the SSS, etc. Accordingly, the UE 115-a may identify the RAT associated with the base station 105-a and therefore perform wireless communications on channel(s) of the identified RAT.

Figure 3C:
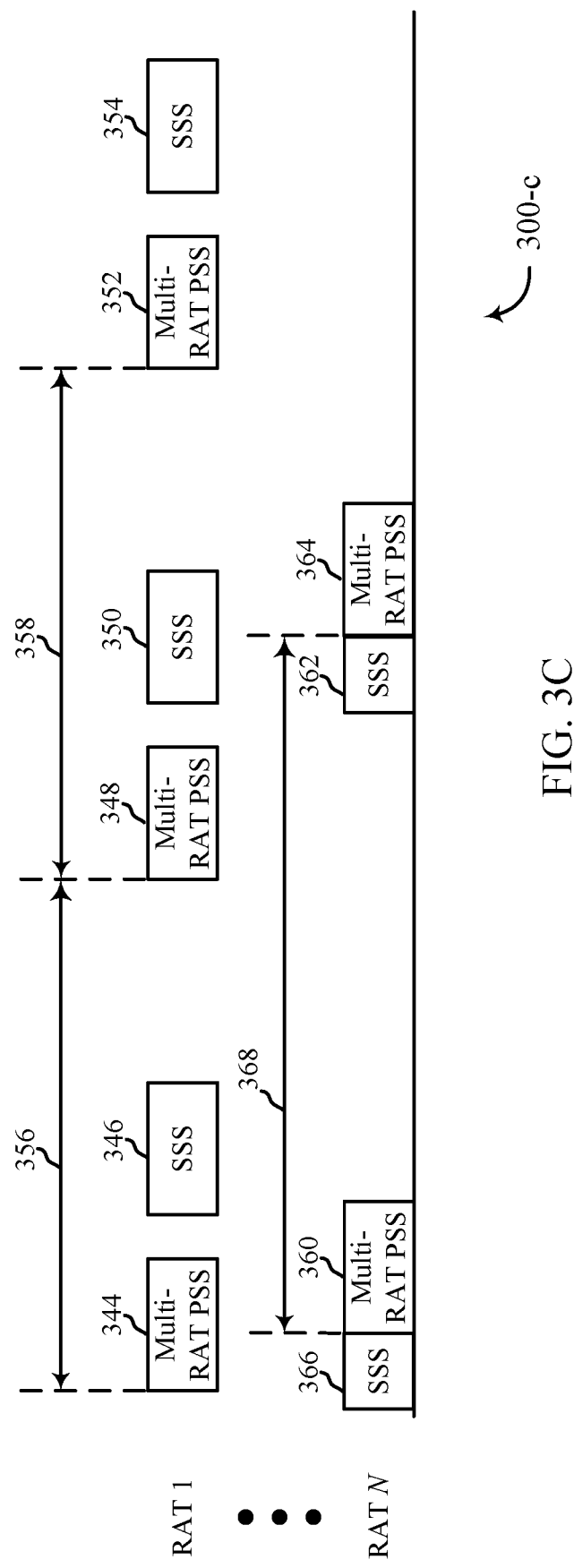

FIGS. 3A-3C show diagrams 300, which are examples of common synchronization signals used for RAT identification, in accordance with various aspects of the present disclosure. The diagrams 300 generally provide examples of multi-RAT PSS/SSS transmission schemes that can be used according to the described techniques. The diagrams 300 may implement aspects of the wireless communications system 100 described with reference to FIG. 1. The diagrams 300 may implement aspects of the example communications between the UE 115-a and the base station 105-a described with reference to FIG. 2. Aspect of the diagrams 300 may be implemented by the UEs 115 and/or base stations 105 described with reference to FIGS. 1 and 2.

FIG. 3A shows diagram 300-a which shows an example of multi-RAT PSS and SSS transmission scheme used for RAT identification. The transmission scheme shown in diagram 300-a may be used for each of the plurality of RATs, e.g., each base station 105 may utilize the same periodicity and/or structure for the multi-RAT PSS and SSS. Broadly, the transmission scheme shown in diagram 300-a may include a common multi-RAT PSS and SSS with the same periodicity among the plurality of RATs. The SSS may include information identifying the associated RAT.

For example, each base station 105 associated with the plurality of RATs may transmit a multi-RAT PSS 302 followed by a SSS 304 according to a fixed schedule. This transmission scheme may include repeated transmissions of additional multi-RAT PSSs 306 and 310 followed by second SSSs 308 and 312, respectively. The periodicity of the multi-RAT PSS and SSS transmission scheme is illustrated during time periods 314 and 316. That is, the time period 314 between the transmission of multi-RAT PSS 302 and multi-RAT PSS 306 is the same as the time period 316 between the transmission of multi-RAT PSS 306 and multi-RAT PSS 310. Similarly, the time periods between transmission of the SSSs is the same for each RAT of the plurality of RATs. Thus, a UE 115 decoding the multi-RAT PSS may know that each of the plurality of RATs utilize the same periodicity for the multi-RAT PSS and SSS transmissions.

FIG. 3B shows diagram 300-b which shows an example of multi-RAT PSS and SSS transmission scheme used for RAT identification. As shown in diagram 300-b, each RAT of the plurality of RATs may use a different multi-RAT PSS/SSS transmission scheme. Broadly, the transmission scheme shown in diagram 300-b may include a common multi-RAT PSS and SSS with a different periodicity among the plurality of RATs. The SSS may include information identifying the associated RAT and/or the identification of the associated RAT may be based on the periodicity of the multi-RAT PSS and/or the SSS.

For example, a base station 105 associated with RAT 1 may transmit a multi-RAT PSS 318 followed by a SSS 320 according to a fixed schedule. This transmission scheme may include repeated transmissions of additional multi-RAT PSSs 322 and 326 followed by second SSSs 324 and 328, respectively. The periodicity of the multi-RAT PSS and SSS transmission scheme for RAT 1 is illustrated during time periods 330 and 332. That is, the time period 330 between the transmission of multi-RAT PSS 318 and multi-RAT PSS 322 is the same as the time period 332 between the transmission of multi-RAT PSS 322 and multi-RAT PSS 326. Similarly, the time periods between transmission of the SSSs is the same for RAT 1.

For RAT N, where N is a positive integer and is based on the number of different RATs, the periodicity of the multi-RAT PSS and SSS transmission scheme is different from the periodicity utilized for RAT 1. For example, a base station 105 associated with RAT N may transmit a multi-RAT PSS 334 followed by a SSS 336 according to a fixed schedule. This transmission scheme may include repeated transmissions of an additional multi-RAT PSS 338 followed by second SSS 340. The periodicity of the multi-RAT PSS and SSS transmission scheme for RAT N is illustrated during time periods 342. That is, the time period 342 between the transmission of multi-RAT PSS 334 and multi-RAT PSS 338 is different from the time periods 330 and/or 332 for RAT 1. As discussed, the associated RAT identification may be included in the SSS or may be implicitly conveyed based on the periodicity of the multi-RAT PSS/SSS transmission scheme.

FIG. 3C shows diagram 300-c which shows an example multi-RAT PSS and SSS transmission scheme used for RAT identification. As shown in diagram 300-c, each RAT of the plurality of RATs may use a different multi-RAT PSS/SSS transmission scheme. Broadly, the transmission scheme shown in diagram 300-c may include a common multi-RAT PSS with a different periodicity among the plurality of RATs, but may also include a different SSS for each RAT of the plurality of RATs. The SSS format may include or convey information identifying the associated RAT and/or the identification of the associated RAT may be based on the periodicity of the multi-RAT PSS and/or the SSS.

For example, a base station 105 associated with RAT 1 may transmit a multi-RAT PSS 344 followed by a SSS 346 according to a fixed schedule. This transmission scheme may include repeated transmissions of additional multi-RAT PSSs 348 and 352 followed by second SSSs 350 and 354, respectively. The periodicity of the multi-RAT PSS and SSS transmission scheme for RAT 1 is illustrated during time periods 356 and 358. That is, the time period 356 between the transmission of multi-RAT PSS 344 and multi-RAT PSS 348 is the same as the time period 358 between the transmission of multi-RAT PSS 348 and multi-RAT PSS 352. Similarly, the time periods between transmission of the SSSs is the same for RAT 1.

For RAT N, where N is a positive integer and is based on the number of different RATs, the periodicity of the multi-RAT PSS and SSS transmission scheme is different from the periodicity utilized for RAT 1. For example, a base station 105 associated with RAT N may transmit a multi-RAT PSS 360 followed by a SSS 362 according to a fixed schedule. This transmission scheme may include repeated transmissions of an additional multi-RAT PSS 364 followed by second SSS. The illustrated SSS 366 is shown for example purposes only and may be associated with an earlier transmitted multi-RAT PSS. The periodicity of the multi-RAT PSS and SSS transmission scheme for RAT N is illustrated during time periods 368. That is, the time period 368 between the transmission of multi-RAT PSS 360 and multi-RAT PSS 364 is different from the time periods 356 and/or 358 for RAT 1. As discussed, the associated RAT identification may be included in the SSS or may be implicitly conveyed based on the periodicity of the multi-RAT PSS/SSS transmission scheme.

In some aspects, the format (e.g., location, structure, etc.) for each of the SSS may be different for each of the plurality of RATs. For example, the format for SSS 346 for RAT 1 may be different from the format for SSS 362 for RAT N. The format of the SSS for the respective RAT may implicitly convey an indication of the identity of the RAT, e.g., the UE 115 may know which format of the SSS is associated with which RAT.

Figure 4:
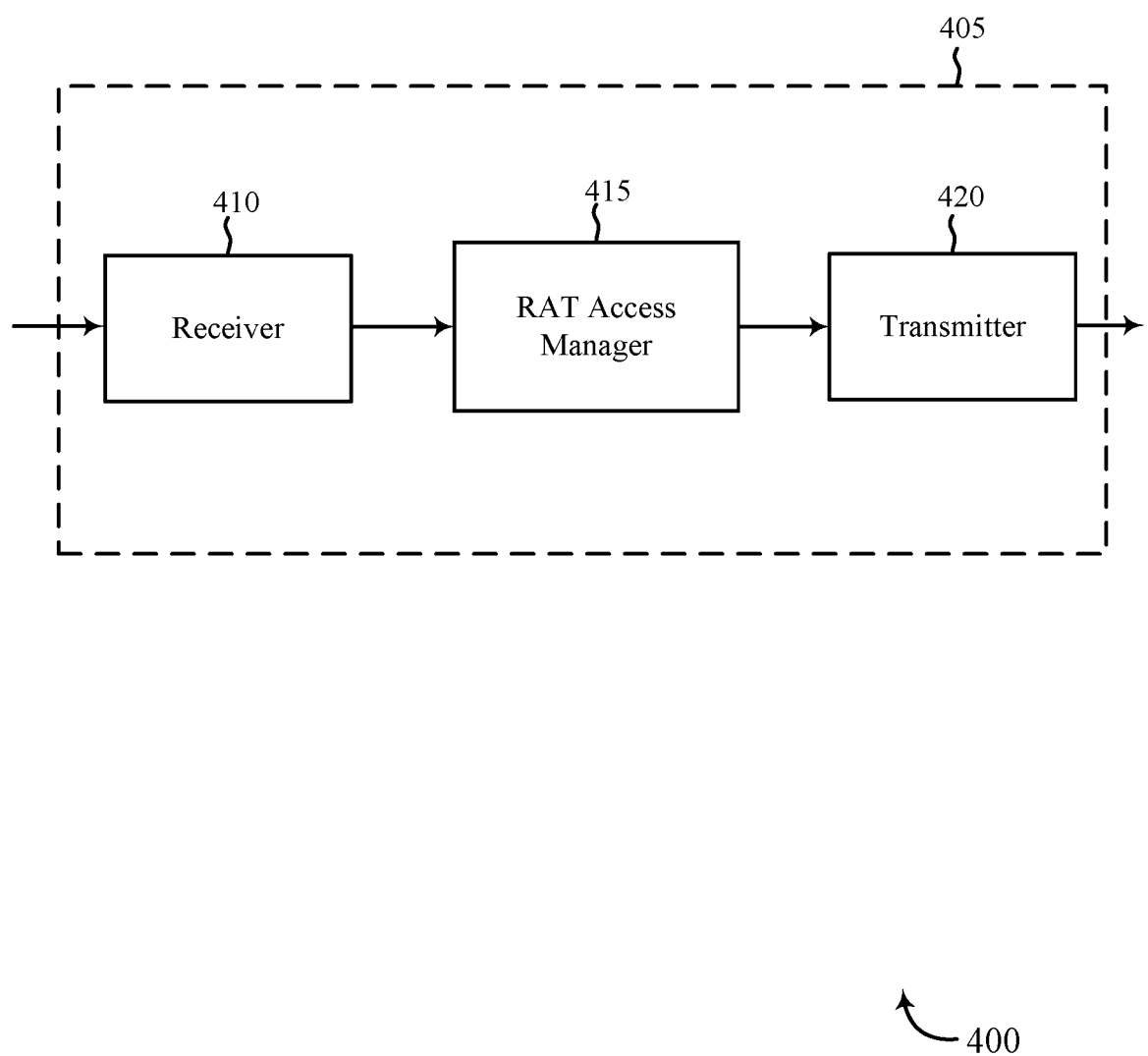
FIG. 4 shows a block diagram of a device configured for use in wireless communication, in accordance with various aspects of the present disclosure.

FIG. 4 shows a block diagram 400 of a device 405 for use in wireless communication, in accordance with various aspects of the present disclosure. The device 405 may be an example of one or more aspects of a UE 115 described with reference to FIGS. 1 and 2. The device 405 may implement aspects of the diagrams 300 described with reference to FIGS. 3A-3C. The device 405 may include a receiver 410, a RAT access manager 415, and/or a transmitter 420. The device 405 may also be, or include a processor (not shown). Each of these components may be in communication with each other.

The components of the device 405 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

The receiver 410 may receive information such as packets, user data, and/or control information associated with various information channels (e.g., control channels, data channels, etc.). The receiver 410 may be configured to receive transmissions including multi-RAT PSS and/or SSS for RAT detection and identification. Information may be passed on to the RAT access manager 415, and to other components of the device 405.

The RAT access manager 415 may monitor, control, provide a means for, or otherwise manage aspects of RAT detection and identification for the device 405. For example, the RAT access manager 415 may decode a multi-RAT PSS that is common among a plurality of RATs. The RAT access manager 415 may decode, based on the decoded multi-RAT PSS, a SSS and identify a RAT associated with the multi-RAT PSS and SSS based, at least in certain aspects, on the decoded SSS.

The transmitter 420 may transmit the one or more signals received from other components of the device 405. The transmitter 420 may transmit transmissions including via an identified RAT for wireless communications. In some examples, the transmitter 420 may be collocated with the receiver 410 in a transceiver component.

Figure 5:
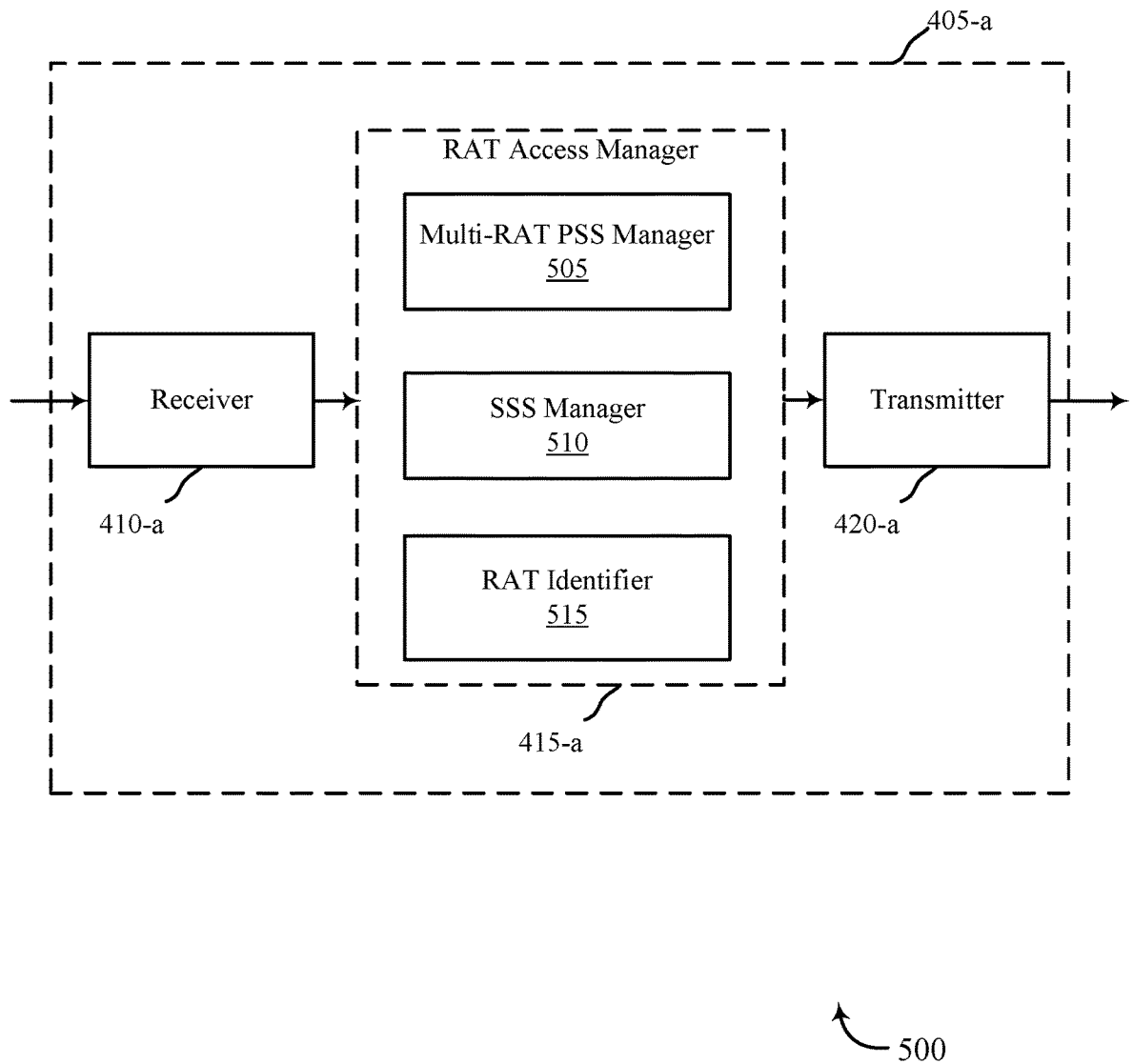
FIG. 5 shows a block diagram of a device configured for use in wireless communication, in accordance with various aspects of the present disclosure.

FIG. 5 shows a block diagram 500 of a device 405-*a* for use in wireless communication, in accordance with various examples. The device 405-*a* may be an example of one or more aspects of a UE 115 described with reference to FIGS. 1 and 2. The device 405-*a* may implement aspects of the diagrams 300 described with reference to FIGS. 3A-3C. The device 405-*a* may also be an example of a device 405 described with reference to FIG. 4. The device 405-*a* may include a receiver 410-*a*, a RAT access manager 415-*a*, and/or a transmitter 420-*a*, which may be examples of the corresponding components of device 405. The device 405-*a* may also include a processor (not shown). Each of these components may be in communication with each other. The RAT access manager 415-*a* may include a multi-RAT PSS manager 505, a SSS manager 510, and/or a RAT identifier 515. The receiver 410-*a* and the transmitter 420-*a* may perform the functions of the receiver 410 and the transmitter 420, of FIG. 4, respectively.

The multi-RAT PSS manager 505 may monitor, control, provide a means for, or otherwise manage aspects of multi-RAT PSS detection and decoding for the device 405-*a*. For example, the multi-RAT PSS manager 505 may decode a multi-RAT PSS that is common among a plurality of RATs. The multi-RAT PSS may be associated with a periodic schedule for transmission. The multi-RAT PSS may include a timing component and a frequency component associated with a RAT, e.g., the RAT being utilized by the base station transmitting the multi-RAT PSS. The multi-RAT PSS manager 505 may determine the periodicity associated with the multi-RAT PSS.

Examples of the plurality of RATs include, but are not limited to, a LTE RAT, a UMTS RAT, a GSM RAT, etc. In some examples, two RATs of the plurality of RATs may use the same physical layer mode, but different physical layer parameters. In this example, the two RATs may be considered the same RAT. In other examples, two RATs of the plurality of RATs may use OFDMA techniques for downlink communications, but different tone spacing and/or cyclic prefix length parameters. In this example, the two RATs may be considered different RATs.

The SSS manager 510 may monitor, control, provide a means for, or otherwise manage aspects of SSS detection and decoding for the device 405-*a*. For example, the SSS manager 510 may decode, based on the decoded multi-RAT PSS, a SSS. The SSS manager 510 may identify a sequence number included in the SSS, the sequence number including or otherwise conveying an identifier of the RAT. An example sequence number may include a modulation scheme associated with the RAT. The SSS manager 510 may determine a periodicity associated with the decoded SSS. The SSS manager 510 may determine a format associated with the decoded SSS.

The RAT identifier 515 may monitor, control, provide a means for, or otherwise manage aspects of identifying a RAT for the device 405-a. For example, the RAT identifier 515 may identify, based on the decoded SSS, a RAT associated with the multi-RAT PSS and the SSS. The RAT identifier 515 may identify the RAT based on the sequence number included in the SSS. The RAT identifier 515 may identify the RAT based on the format of the SSS. The RAT identifier 515 may identify the RAT based on the periodicity of the SSS. The RAT identifier 515 may identify the RAT based on the periodicity of the multi-RAT PSS.

Figure 6:
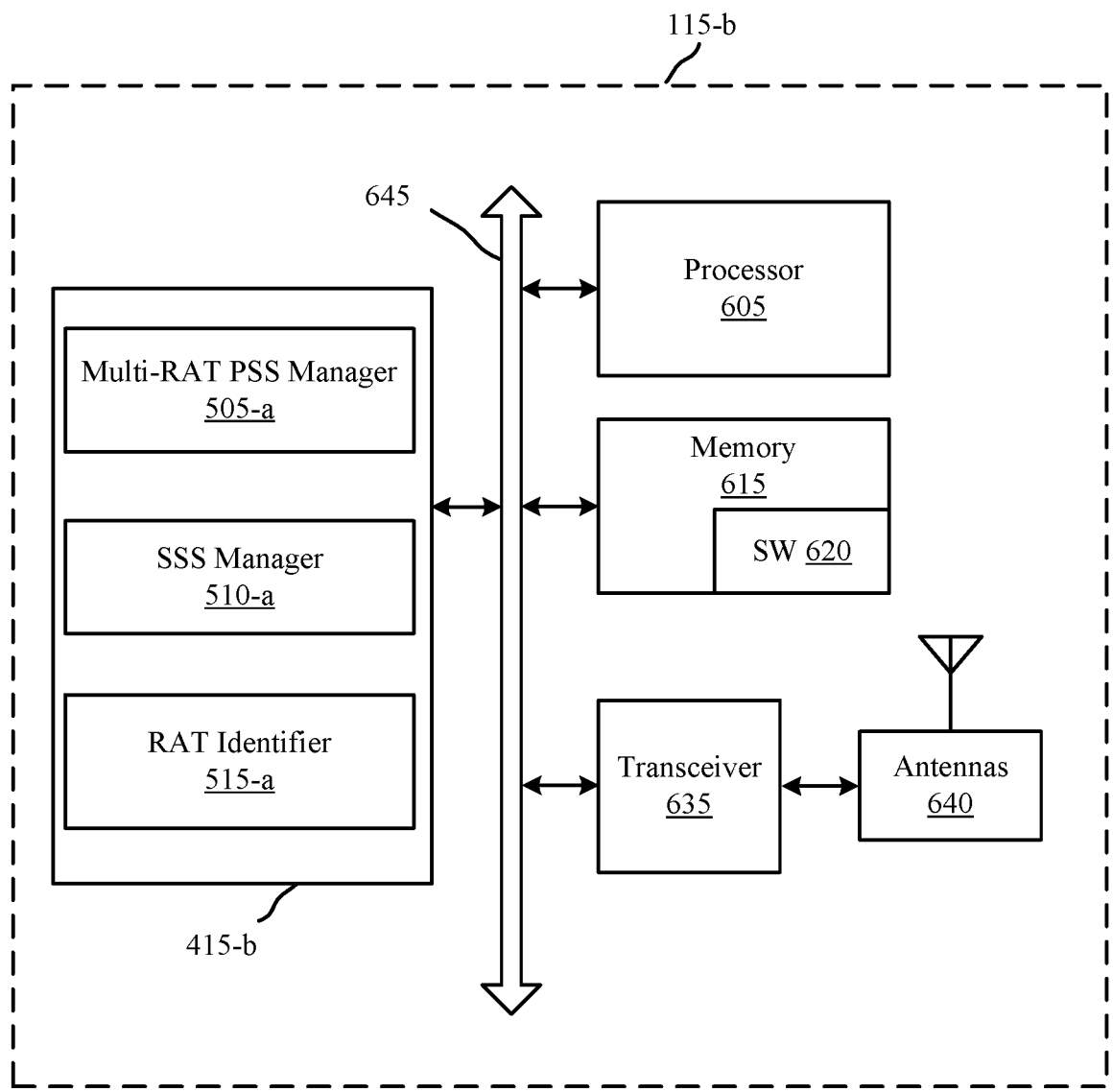
FIG. 6 shows a block diagram of a user equipment (UE) for use in wireless communication, in accordance with various aspects of the present disclosure.

FIG. 6 shows a system 600 for use in wireless communication, in accordance with various examples. System 600 may include a UE 115-b, which may be an example of the UEs 115 of FIGS. 1 and 2 and/or an example of aspects of devices 405 of FIGS. 4 and 5. The UE 115-b may implement aspects of the diagrams 300 described with reference to FIGS. 3A to 3C. Generally, the UE 115-b may be configured to support RAT detection and identification using a common synchronization signal in accordance with the described techniques.

The UE 115-b may generally include components for bi-directional voice and data communications including components for transmitting communications and components for receiving communications. The UE 115-b may include antenna(s) 640, a transceiver 635, a processor 605, and memory 615 (including software (SW) 620), each of which may communicate, directly or indirectly, with each other (e.g., via one or more buses 645). The transceiver 635 may be configured to communicate bi-directionally, via the antenna(s) 640 and/or one or more wired or wireless links, with one or more networks, as described above. For example, the transceiver 635 may be configured to communicate bi-directionally with base stations 105 with reference to FIGS. 1 and 2. The transceiver 635 may include a modem configured to modulate the packets and provide the modulated packets to the antenna(s) 640 for transmission, and to demodulate packets received from the antenna(s) 640. While the UE 115-b may include a single antenna 640, the UE 115-b may have multiple antennas capable of concurrently transmitting and/or receiving multiple wireless transmissions. The transceiver 635 may be capable of concurrently communicating with one or more base stations 105 via multiple component carriers and/or via different RATs.

The UE 115-b may include a RAT access manager 415-b, which may perform the functions described above for the RAT access manager 415 of device 405 of FIGS. 4 and 5. For example, the RAT access manager 415-b may include a multi-RAT PSS manager 505-a, a SSS manager 510-a, a RAT identifier 515-b, which may be examples and perform the functions of the multi-RAT PSS manager 505, SSS manager 510, and RAT identifier 515, respectively, of FIG. 5.

The memory 615 may include random access memory (RAM) and read-only memory (ROM). The memory 615 may store computer-readable, computer-executable software/firmware code 620 containing instructions that are configured to, when executed, cause the processor 605 to perform various functions described herein (e.g., decode a multi-RAT PSS and SSS and identify an associated RAT based on the decoded synchronization signals, etc.). Alternatively, the computer-readable, computer-executable software/firmware code 620 may not be directly executable by the processor 605, but be configured to cause a computer (e.g., when compiled and executed) to perform functions described herein. The processor 605 may include an intelligent hardware device, e.g., a central processing unit (CPU), a microcontroller, an application-specific integrated circuit (ASIC), etc.

Figure 7:
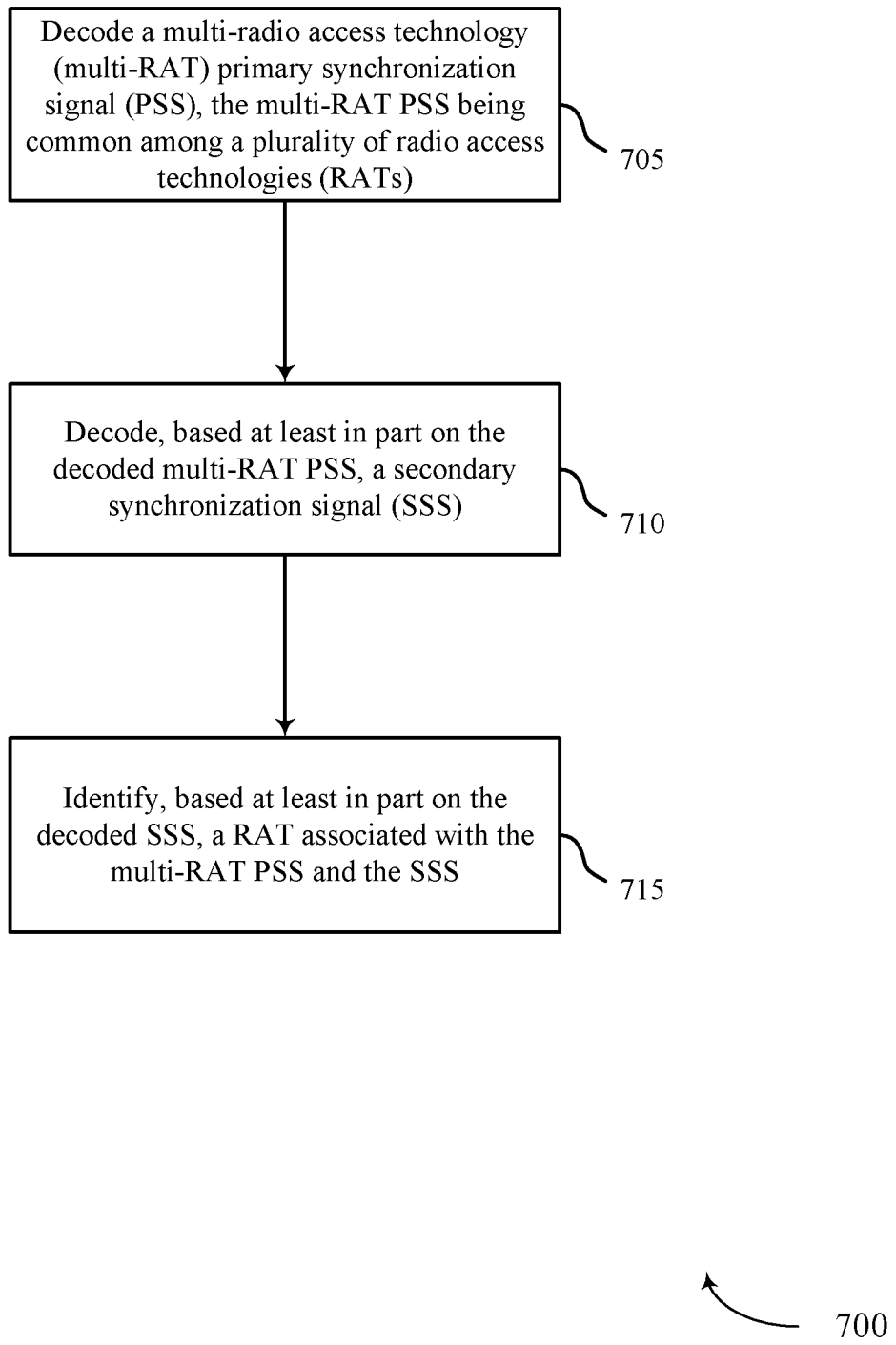
FIG. 7 is a flow chart illustrating an example of a method for wireless communication, in accordance with various aspects of the present disclosure.

FIG. 7 is a flow chart illustrating an example of a method 700 for wireless communication, in accordance with various aspects of the present disclosure. For clarity, the method 700 is described below with reference to aspects of one or more of a UE described with reference to FIGS. 1, 2 and 6, and/or aspects of one or more of the devices 405 described with reference to FIGS. 4 and 5. In some examples, a UE may execute one or more sets of codes to control the functional elements of the UE to perform the functions described below. Additionally or alternatively, the UE may perform one or more of the functions described below using special-purpose hardware.

At block 705, the method 700 may include the UE decoding a multi-RAT PSS that is common among a plurality of RATs. The operation(s) at block 705 may be performed using the multi-RAT PSS manager 505 described with reference to FIGS. 4-6.

At block 710, the method 700 may include the UE decoding, based on the decoded multi-RAT PSS, a SSS. The operation(s) at block 710 may be performed using the SSS manager 510 described with reference to FIGS. 4-6.

At block 715, the method 700 may include the UE identifying, based on the decoded SSS, a RAT associated with the multi-RAT PSS and the SSS. The operations at block 715 may be performed using the RAT identifier 515 described with reference to FIGS. 4-6.

Figure 8:
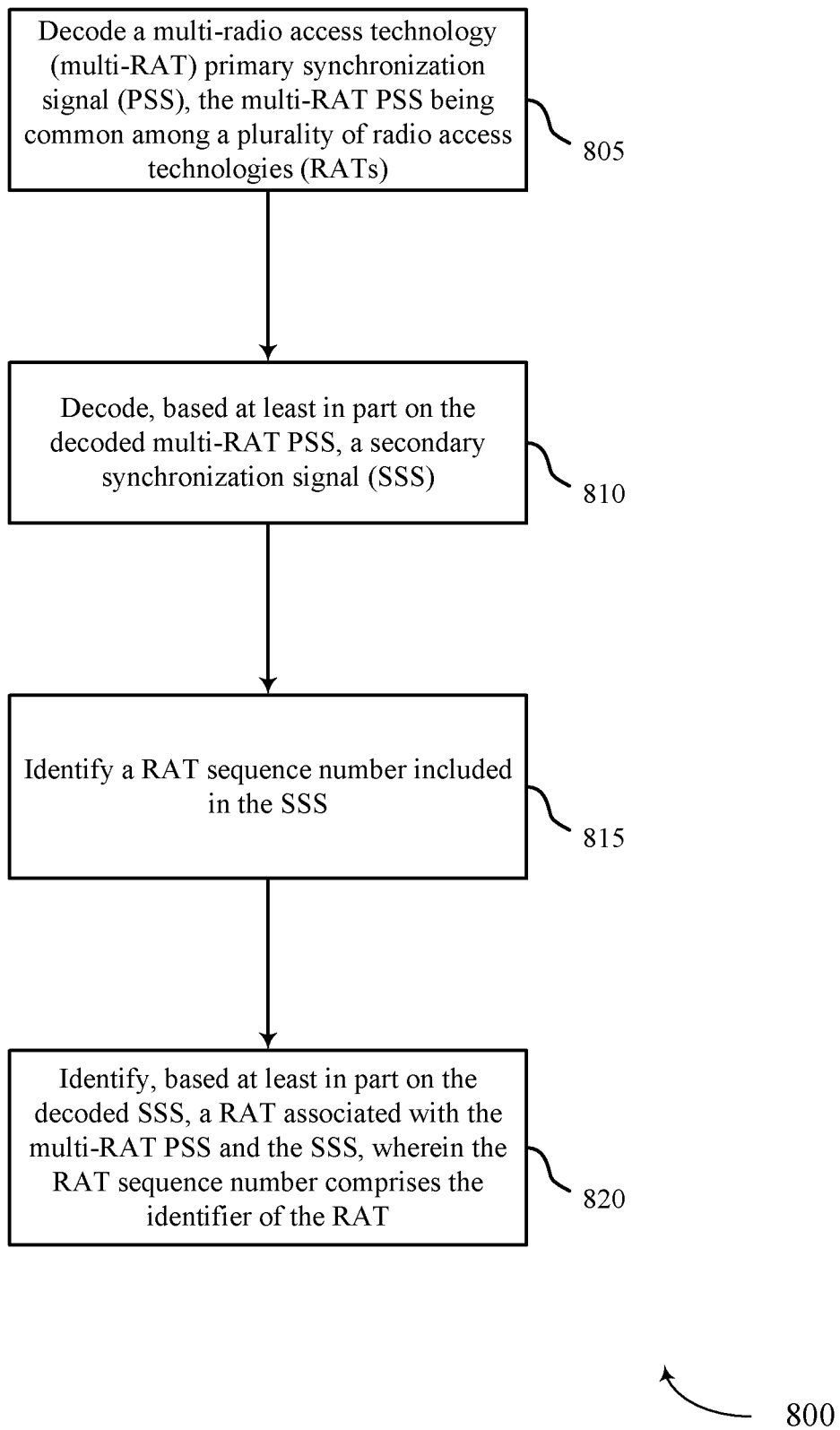
FIG. 8 is a flow chart illustrating an example of a method for wireless communication, in accordance with various aspects of the present disclosure.

FIG. 8 is a flow chart illustrating an example of a method 800 for wireless communication, in accordance with various aspects of the present disclosure. For clarity, the method 800 is described below with reference to aspects of one or more of a UE described with reference to FIGS. 1, 2 and 6, and/or aspects of one or more of the devices 405 described with reference to FIGS. 4 and 5. In some examples, a UE may execute one or more sets of codes to control the functional elements of the UE to perform the functions described below. Additionally or alternatively, the UE may perform one or more of the functions described below using special-purpose hardware.

At block 805, the method 800 may include the UE decoding a multi-RAT PSS that is common among a plurality of RATs. The operation(s) at block 805 may be performed using the multi-RAT PSS manager 505 described with reference to FIGS. 4-6.

At block 810, the method 800 may include the UE decoding, based on the decoded multi-RAT PSS, a SSS. The operation(s) at block 810 may be performed using the SSS manager 510 described with reference to FIGS. 4-6.

At block 815, the method 800 may include the UE identifying a RAT sequence number included in the SSS. The operation(s) at block 815 may be performed using the SSS manager 510 described with reference to FIGS. 4-6.

At block 820, the method 800 may include the UE identifying, based on the decoded SSS, a RAT associated with the multi-RAT PSS and the SSS, wherein the RAT sequence number comprises the identifier of the RAT. The operations at block 820 may be performed using the RAT identifier 515 described with reference to FIGS. 4-6.

At block 810, the method 800 may include the UE decoding, based on the decoded multi-RAT PSS, a SSS. The operation(s) at block 810 may be performed using the SSS manager 510 described with reference to FIGS. 4-6.

Figure 9:
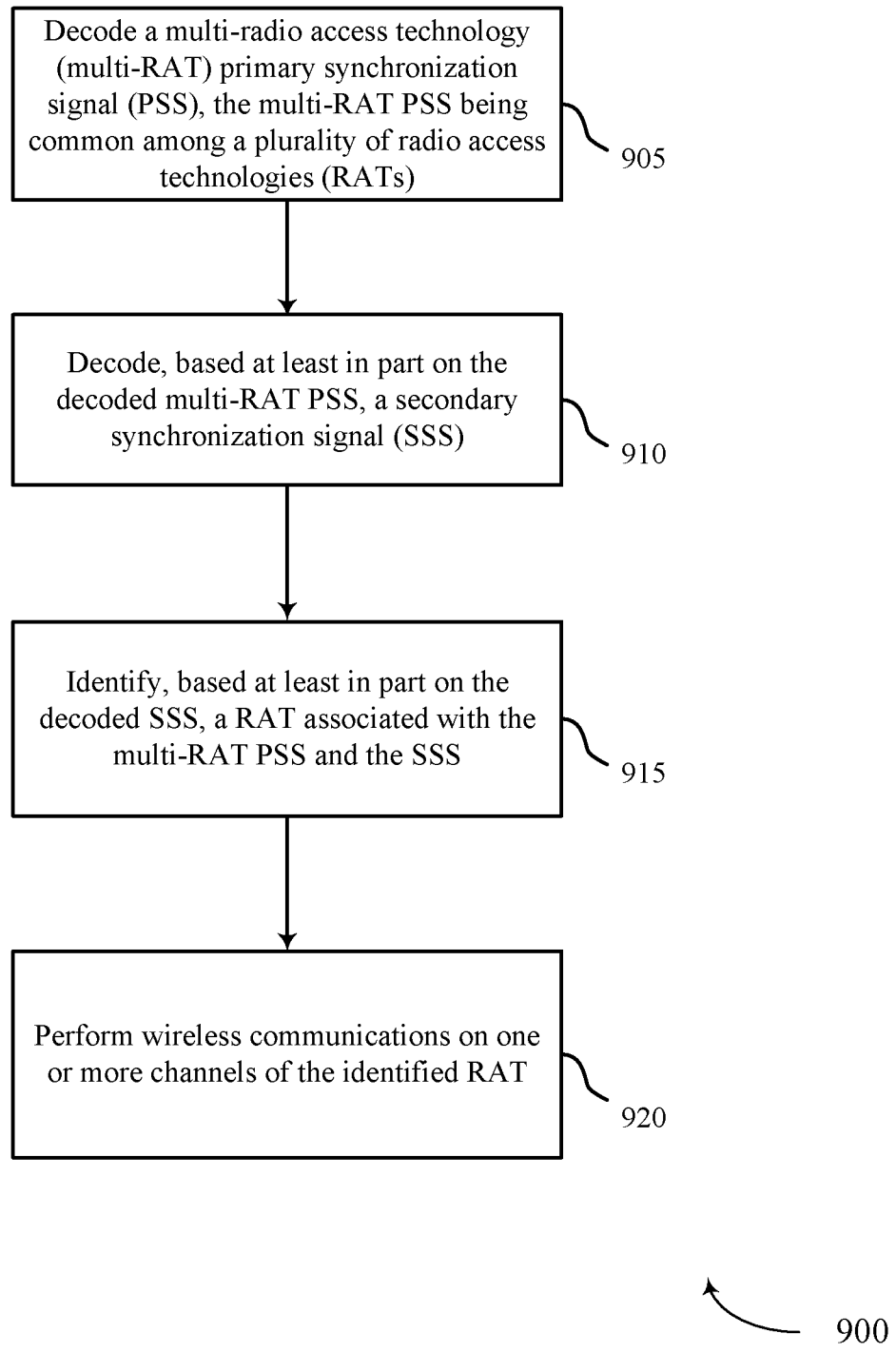
FIG. 9 is a flow chart illustrating an example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of one or more of a UE described with reference to FIGS. 1, 2 and 6, and/or aspects of one or more of the devices 405 described with reference to FIGS. 4 and 5. In some examples, a UE may execute one or more sets of codes to control the functional elements of the UE to perform the functions described below. Additionally or alternatively, the UE may perform one or more of the functions described below using special-purpose hardware.

At block 905, the method 900 may include the UE decoding a multi-RAT PSS that is common among a plurality of RATs. The operation(s) at block 905 may be performed using the multi-RAT PSS manager 505 described with reference to FIGS. 4-6.

At block 910, the method 900 may include the UE decoding, based on the decoded multi-RAT PSS, a SSS. The operation(s) at block 910 may be performed using the SSS manager 510 described with reference to FIGS. 4-6.

At block 915, the method 900 may include the UE identifying, based on the decoded SSS, a RAT associated with the multi-RAT PSS and the SSS. The operations at block 915 may be performed using the RAT identifier 515 described with reference to FIGS. 4-6.

At block 920, the method 900 may include the UE performing wireless communications on one or more channels of the identified RAT. The operations at block 920 may be performed using the RAT access manager 415 described with reference to FIGS. 4-6.

Thus, the methods 700-900 may provide for wireless communication. It should be noted that the methods 700-900 are just example implementations and that the operations of the methods 700-900 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   decoding, at a user equipment (UE), a multi-radio access technology (multi-RAT) primary synchronization signal (PSS), the multi-RAT PSS being common among a plurality of radio access technologies (RATs);
   decoding, at the UE, based at least in part on the decoded multi-RAT PSS, a secondary synchronization signal (SSS);
   identifying a RAT associated with the multi-RAT PSS and the SSS based at least in part on identifying a RAT sequence number included in the decoded SSS, the RAT sequence number comprising an identifier of the RAT; and
   performing wireless communications on one or more channels of the identified RAT.

2. The method of claim 1, wherein RAT sequence number comprises a modulation scheme associated with the identified RAT.

3. The method of claim 1, wherein identifying the RAT comprises:
   determining a periodicity associated with the decoded SSS; and
   identifying the RAT based at least in part on the periodicity.

4. The method of claim 1, wherein identifying the RAT comprises:
   determining a periodicity associated with the multi-RAT PSS; and
   identifying the RAT based at least in part on the periodicity.

5. The method of claim 1, wherein identifying the RAT comprises:
   determining a format of the decoded SSS; and
   identifying the RAT based at least in part on the format of the decoded SSS.

6. The method of claim 1, wherein the identified RAT comprises at least one of a global system for mobiles (GSM) RAT, or a universal mobile telecommunications service (UMTS) RAT, or a long term evolution (LTE) RAT, or combinations thereof.

7. The method of claim 1, wherein the multi-RAT PSS comprises a timing component and a frequency component associated with the identified RAT.

8. The method of claim 1, wherein at least two RATs of the plurality of RATs utilize the same physical layer modes, wherein each of the at least two RATs utilize different physical layer parameters.

9. The method of claim 8, wherein the at least two RATs are the same RATs.

10. The method of claim 1, wherein
    at least two RATs of the plurality of RATs utilize orthogonal frequency division multiple access (OFDMA) techniques for downlink communications, wherein each of the at least two RATs utilize a different tone spacing parameter and a different cyclic prefix length; and
    using a periodicity of SSS relative to PSS to indicate RAT or operation modes.

11. The method of claim 10, wherein the at least two RATs are different RATs.

12. An apparatus for wireless communication, comprising:
    a processor;
    memory in electronic communication with the processor;
    instructions stored in the memory, the instructions being executable by the processor to:
      decode, at a user equipment (UE), a multi-radio access technology (multi-RAT) primary synchronization signal (PSS), the multi-RAT PSS being common among a plurality of radio access technologies (RATs);
      decode, at the UE, based at least in part on the decoded multi-RAT PSS, a secondary synchronization signal (SSS);
      identify a RAT associated with the multi-RAT PSS and the SSS based at least in part on identifying a RAT sequence number included in the decoded SSS, the RAT sequence number comprising an identifier of the RAT; and
      perform wireless communications on one or more channels of the identified RAT.

13. The apparatus of claim 12, wherein the RAT sequence number comprises a modulation scheme associated with the identified RAT.

14. The apparatus of claim 12, wherein the instructions to identify the RAT are further executable to:
    determine a periodicity associated with the decoded SSS; and
    identify the RAT based at least in part on the periodicity.

15. The apparatus of claim 12, wherein the instructions to identify the RAT are further executable to:
    determine a periodicity associated with the multi-RAT PSS; and
    identify the RAT based at least in part on the periodicity.

16. The apparatus of claim 12, wherein the instructions to identify the RAT are further executable to:

determine a format of the decoded SSS; and
identify the RAT based at least in part on the format of the decoded SSS.

17. The apparatus of claim 12, wherein the identified RAT comprises at least one of a global system for mobiles (GSM) RAT, or a universal mobile telecommunications service (UMTS) RAT, or a long term evolution (LTE) RAT, or combinations thereof.

18. The apparatus of claim 12, wherein the multi-RAT PSS comprises a timing component and a frequency component associated with the identified RAT.

19. The apparatus of claim 12, wherein at least two RATs of the plurality of RATS utilize the same physical layer modes, wherein each of the at least two RATs utilize different physical layer parameters.

20. The apparatus of claim 19, wherein the at least two RATs are the same RAT.

21. The apparatus of claim 12, wherein at least two RATS of the plurality of RATs utilize orthogonal frequency division multiple access (OFDMA) techniques for downlink communications, wherein each of the at least two RATs utilize a different tone spacing parameter and a different cyclic prefix length.

22. The apparatus of claim 21, wherein the at least two RATs are different RATs.

23. An apparatus for wireless communication, comprising:
   means for decoding, at a user equipment (UE), a multi-radio access technology (multi-RAT) primary synchronization signal (PSS), the multi-RAT PSS being common among a plurality of radio access technologies (RATs);
   means for decoding, at the UE, based at least in part on the decoded multi-RAT PSS, a secondary synchronization signal (SSS);
   means for identifying a RAT associated with the multi-RAT PSS and the SSS based at least in part on identifying a RAT sequence number included in the decoded SSS, the RAT sequence number comprising an identifier of the RAT; and
   means for performing wireless communications on one or more channels of the identified RAT.

24. The apparatus of claim 23, wherein the RAT sequence number comprises a modulation scheme associated with the identified RAT.

25. A non-transitory computer-readable medium storing computer-executable code for wireless communication, the code executable by a processor to:
   decode, at a user equipment (UE), a multi-radio access technology (multi-RAT) primary synchronization signal (PSS), the multi-RAT PSS being common among a plurality of radio access technologies (RATs);
   decode, at the UE, based at least in part on the decoded multi-RAT PSS, a secondary synchronization signal (SSS);
   identify a RAT associated with the multi-RAT PSS and the SSS based at least in part on identifying a RAT sequence number included in the decoded SSS, the RAT sequence number comprising an identifier of the RAT; and
   perform wireless communications on one or more channels of the identified RAT.

26. The computer readable medium of claim 25, wherein the RAT sequence number comprises a modulation scheme associated with the identified RAT.

* * * * *